US012250978B2

(12) United States Patent
Bull

(10) Patent No.: US 12,250,978 B2
(45) Date of Patent: Mar. 18, 2025

(54) MORTI-WRAP

(71) Applicant: Shannon Kenda Bull, Decatur, IL (US)

(72) Inventor: Shannon Kenda Bull, Decatur, IL (US)

( * ) Notice: Subject to any disclaimer, the term of this patent is extended or adjusted under 35 U.S.C. 154(b) by 0 days.

(21) Appl. No.: 17/803,195

(22) Filed: Jun. 16, 2023

(65) Prior Publication Data

US 2024/0423860 A1 Dec. 26, 2024

(51) Int. Cl.
*A61G 17/06* (2006.01)
*A41D 13/02* (2006.01)
*A41D 27/10* (2006.01)

(52) U.S. Cl.
CPC ............. *A41D 13/02* (2013.01); *A41D 27/10* (2013.01); *A61G 17/06* (2013.01)

(58) Field of Classification Search
CPC ........ A61G 17/06; A41D 13/02; A41D 27/10; A41B 13/005; A01N 1/00
See application file for complete search history.

(56) References Cited

U.S. PATENT DOCUMENTS 1,612,279 A * 12/1926 Friedline .................. A41D 1/00 2/105
1,626,450 A * 4/1927 Cannon .................... A41D 1/00 2/235
2,709,667 A * 5/1955 Grubb .................. A62B 17/001 2/5
4,031,565 A * 6/1977 Coates ..................... A41B 9/00 2/78.2
4,831,664 A * 5/1989 Suda .................... A62B 17/006 2/457
5,918,314 A * 7/1999 Moses .................... A41D 13/02 2/84
6,604,248 B1 * 8/2003 Brown ................... A41D 13/02 2/84
8,991,019 B1 * 3/2015 Calvert .................. A61G 17/06 27/28
11,376,181 B2 * 7/2022 Gresham ................ A61G 17/06
11,963,560 B2 * 4/2024 Lo ....................... A41D 13/1218
12,102,572 B2 * 10/2024 Holtson ................. A61G 17/06
2006/0010663 A1 * 1/2006 Szypka ................ A61G 17/047 27/28
2007/0009187 A1 * 1/2007 Adamo ................ A61G 17/048 383/41
2010/0138972 A1 * 6/2010 Novak ............... A61G 17/0136 2/243.1
2011/0179547 A1 * 7/2011 Stoneham ............ A41B 13/005 2/83
2018/0042310 A1 * 2/2018 Mortimer ............. A41B 13/005
2019/0075854 A1 * 3/2019 Kravchenko-Berezhnaya ............ A41B 13/005

(Continued)

*Primary Examiner* — William L Miller

(57) ABSTRACT

A vacuum-sealed cadaver garment device for containing a cadaver and limiting the bulky appearance of clothing added to the cadaver includes a coverall constructed of a flexible, air-impermeable material and having a neck edge defined by a neck opening and a pair of cuffs defined by a pair of wrist openings. A neck adhesive is coupled to the coverall adjacent the neck edge and a pair of wrist adhesives are coupled to the coverall adjacent the pair of cuffs which create air-tight seals with the cadaver. A vacuum port is coupled to the coverall which is configured for attaching to a vacuum pump for removing an air from within the coverall, thereby causing a pressure differential that positions the coverall in abutment with the cadaver.

14 Claims, 4 Drawing Sheets

(56) References Cited

U.S. PATENT DOCUMENTS

| | | | | |
|---|---|---|---|---|
| 2020/0383404 | A1* | 12/2020 | Naismith | A41D 13/1263 |
| 2021/0128386 | A1* | 5/2021 | Gresham | A61G 17/06 |
| 2024/0189171 | A1* | 6/2024 | Holtson | A61G 17/06 |

* cited by examiner

MORTI-WRAP

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to cadaver containment garments and more particularly pertains to a new cadaver containment garment for containing a cadaver and limiting the bulky appearance of clothing added to the cadaver.

(2) Description of Related Art Including Information Disclosed Under 37 CFR 1.97 and 1.98

The prior art relates to cadaver containment garments placed on cadavers before adding additional clothing for visitations and funerals. These garments help to contain leaks from body fluids or chemicals used in the preservation of the body, but they often result in a bulky appearance to the clothing placed on the body over the garment. The prior art does not disclose a cadaver containment garment which uses adhesives around openings to the garment and a vacuum port to cause the garment to cling closely to the body, thereby reducing the bulky appearance of additional clothing.

BRIEF SUMMARY OF THE INVENTION

An embodiment of the disclosure meets the needs presented above by generally comprising a coverall constructed of a flexible, air-impermeable material and having a neck edge defined by a neck opening and a pair of cuffs defined by a pair of wrist openings. A neck adhesive is coupled to the coverall adjacent the neck edge and a pair of wrist adhesives are coupled to the coverall adjacent the pair of cuffs which create air-tight seals with the cadaver. A vacuum port is coupled to the coverall which is configured for attaching to a vacuum pump for removing an air from within the coverall, thereby causing a pressure differential that positions the coverall in abutment with the cadaver.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
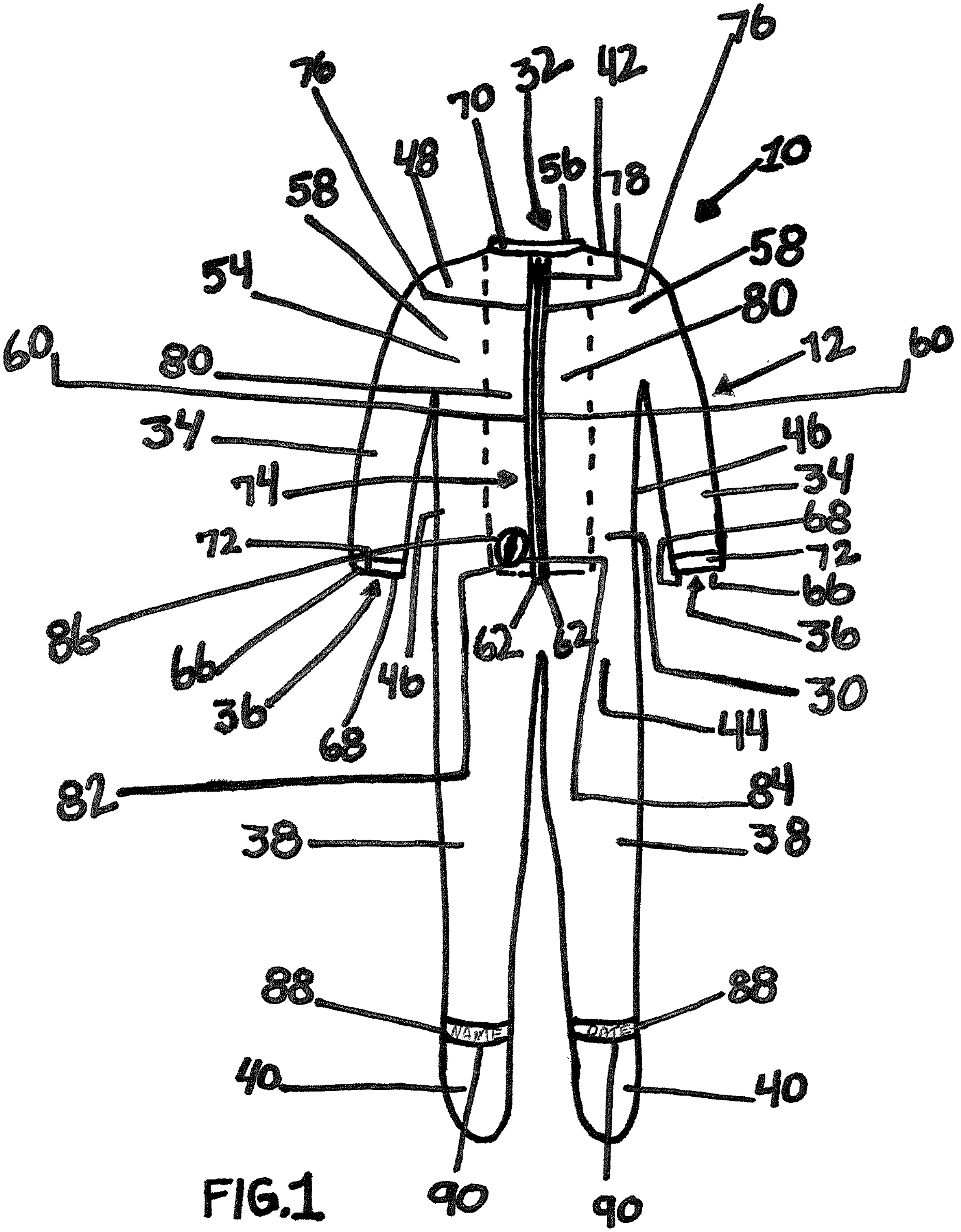
FIG. 1 is a front view of a vacuum-sealed cadaver garment device according to an embodiment of the disclosure.
Figure 2:
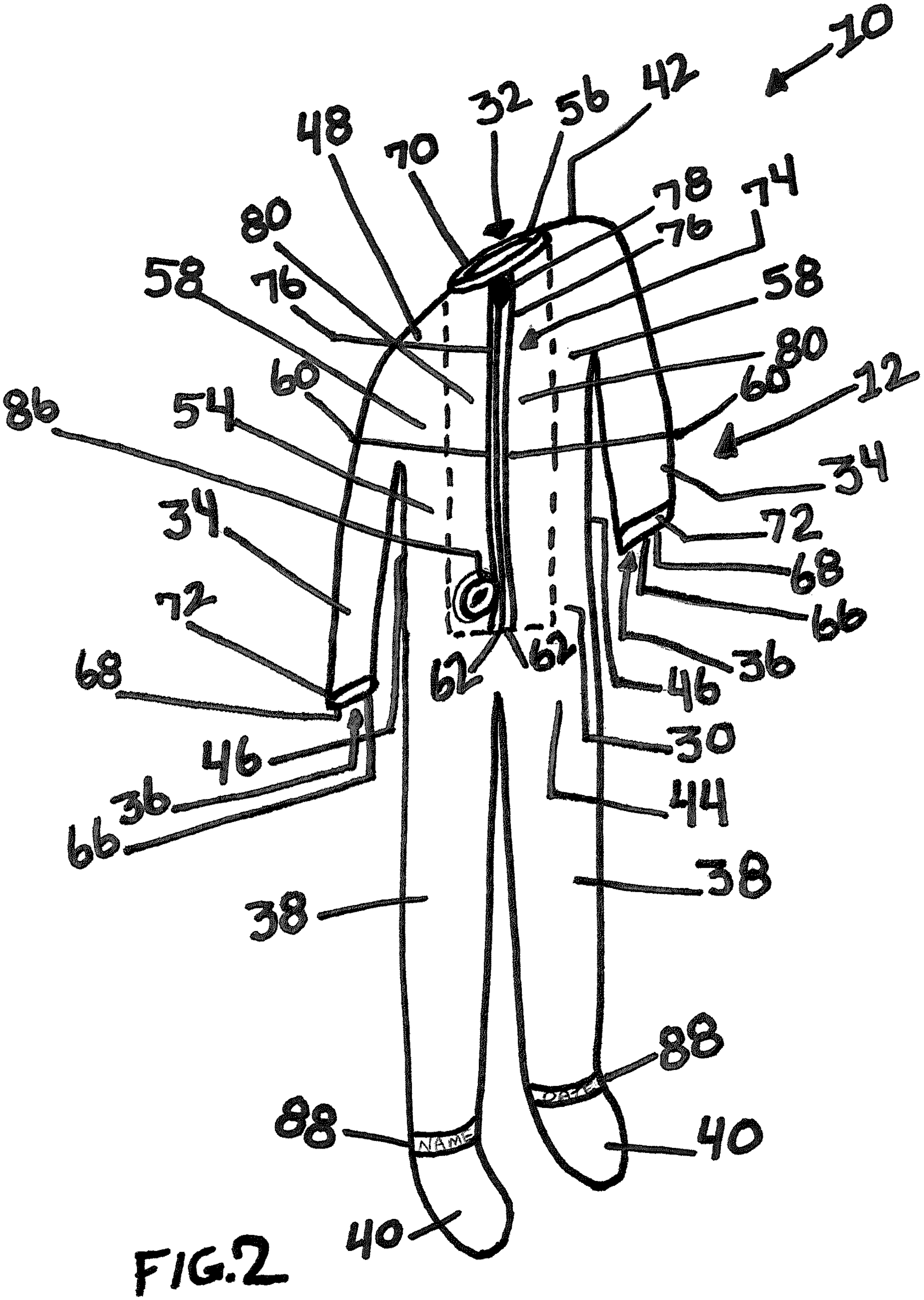
FIG. 2 is a top front side perspective view of an embodiment of the disclosure.
Figure 3:
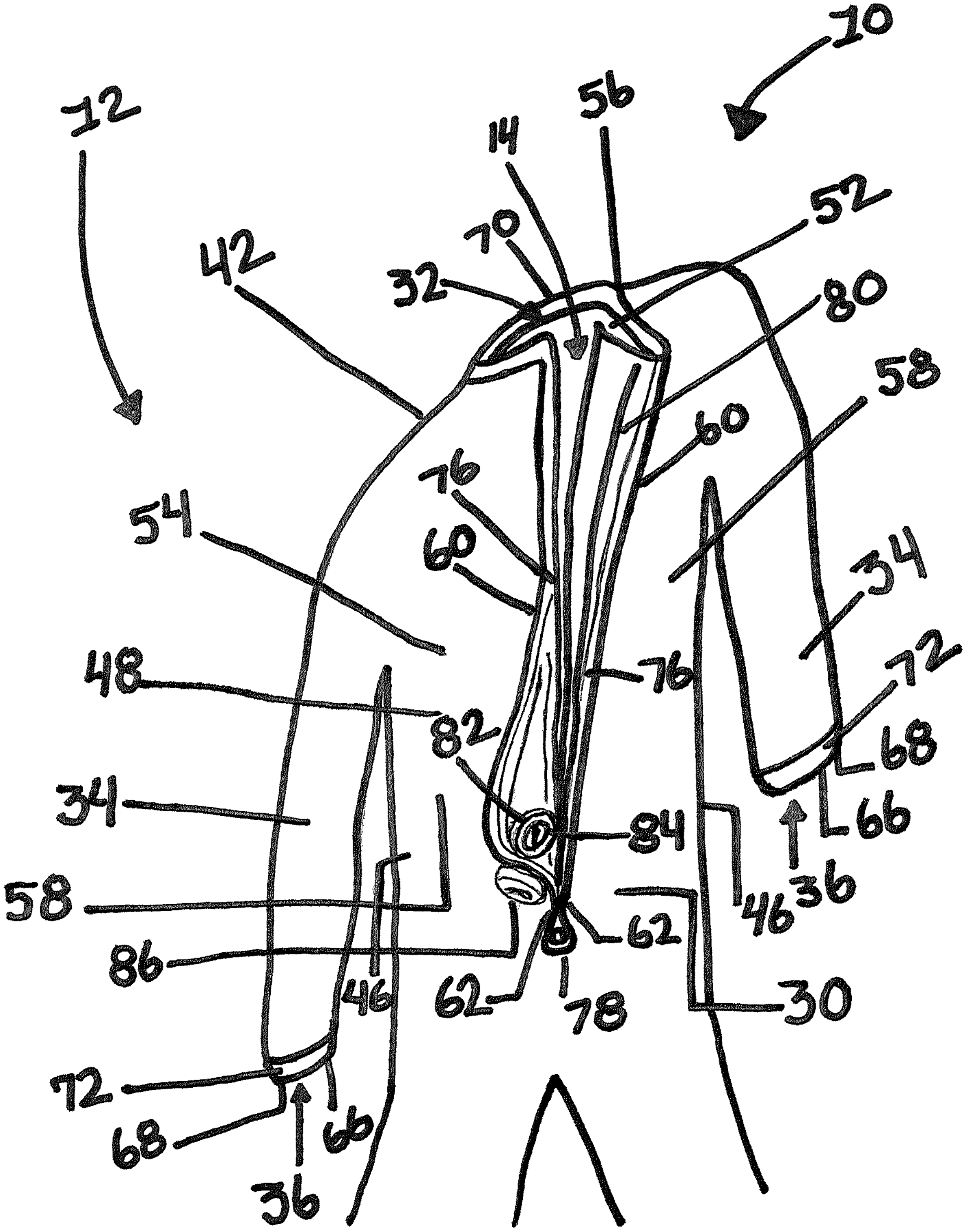
FIG. 3 is a detail perspective view of an embodiment of the disclosure.
Figure 4:
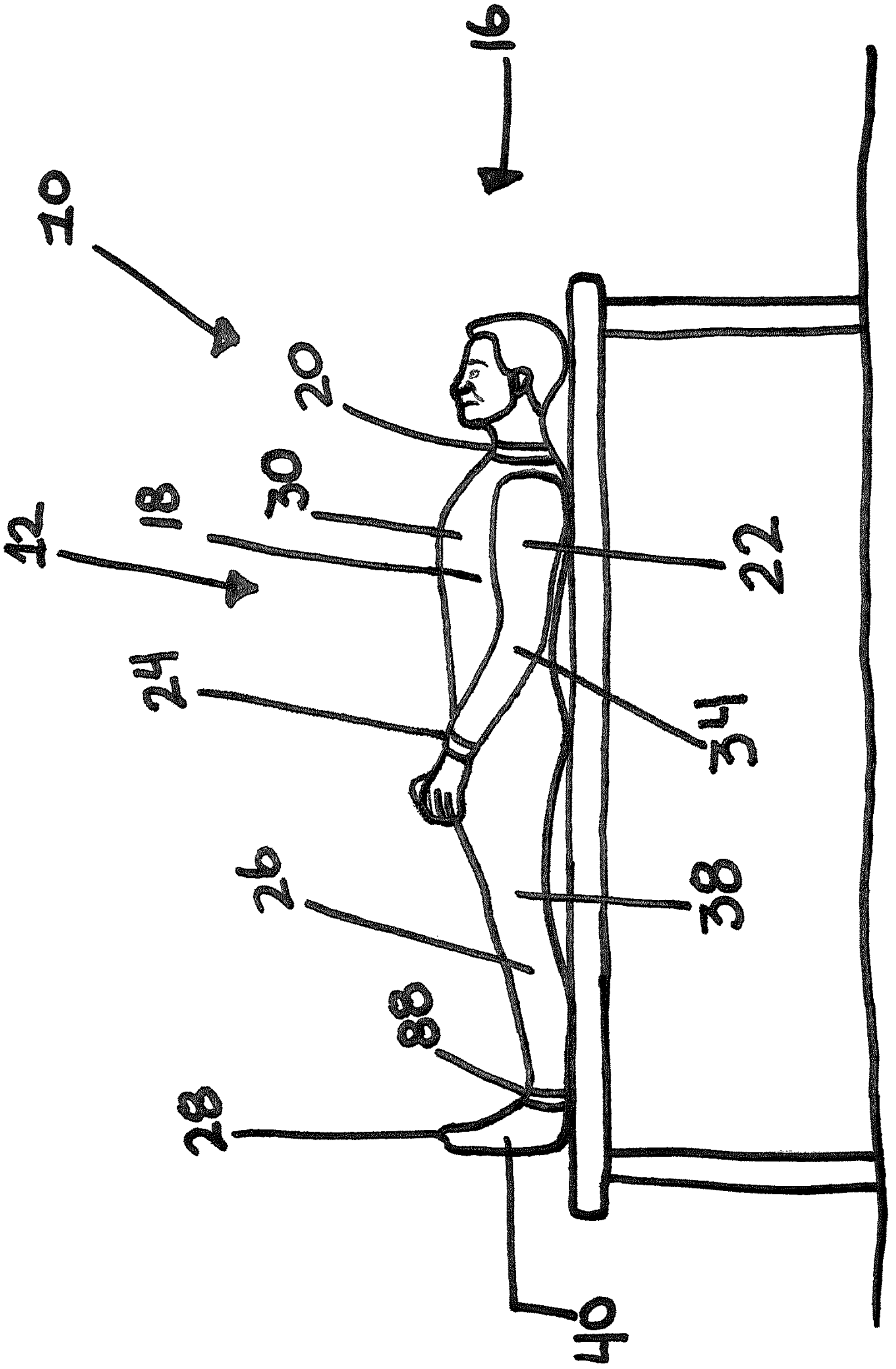
FIG. 4 is an in-use view of an embodiment of the disclosure.

With reference now to the drawings, and in particular to FIGS. 1 through 6 thereof, a new cadaver containment garment embodying the principles and concepts of an embodiment of the disclosure and generally designated by the reference numeral 10 will be described.

As best illustrated in FIGS. 1 through 6, the vacuum-sealed cadaver garment device 10 generally comprises a coverall 12 defining an interior space 14, the coverall 12 is constructed of a flexible, air-impermeable, and transparent material. The coverall 12 may be constructed of a polymer such as polyolefin or vinyl, or a like material. The coverall 12 is configured for being worn by a cadaver 16 and comprises a torso section 30, a neck opening 32, a pair of sleeve sections 34, a pair of wrist openings 36, a pair of leg sections 38, and a pair of foot sections 40. The torso section 30 has a neck end 42 and a bottom end 44 and a pair of lateral sides 46 extending between the neck end 42 and the bottom end 44. The torso section 30 also has a front side 48 and a back side 50, each which extends between the neck end 42 and the bottom end 44 and between the pair of lateral sides 46. The torso section 30 has an inner surface 52 facing the interior space 14 and an outer surface 54 facing away from the interior space 14. The torso section 30 is configured for covering a torso 18 of the cadaver 16 when the cadaver 16 wears the coverall 12. The neck opening 32 extends through the neck end 42 of the torso section 30 to the interior space 14 and is centered between the pair of lateral sides 46 of the torso section 30. The neck opening 32 defines a neck edge 56 which is configured for abutting a neck 20 of the cadaver 16 when the cadaver 16 wears the coverall 12. The front side 48 of the torso section 30 includes a pair of front portions 58, each of which has an inner edge 60 extending from the neck edge 56 toward the bottom end 44 of the torso section 30 to a distal end 62 of the inner edge 60 relative to the neck edge 56. The inner edges 60 of the pair of front portions 58 are removably couplable to each other in abutment. The neck opening 32 enlarges when the inner edges 60 of the pair of front portions 58 uncouple from each other. The neck opening 32 is configured for receiving the cadaver 16 therethrough for wearing the coverall 12 when the inner edges 60 of the pair of front portions 58 are uncoupled from each other.

Each sleeve section 34 is coupled to and extends from an associated lateral side 46 of the torso section 30 adjacent to the neck end 42. Each sleeve section 34 has an inner surface facing the interior space 14 and is configured for covering each of a pair of arms 22 of the cadaver 16 when the cadaver 16 wears the coverall 12. Each sleeve section 34 has a distal end 66 relative to the torso section 30. Each wrist opening 36 is positioned on the distal end 66 of an associated sleeve section 34 of the pair of sleeve sections 34, wherein each wrist opening 36 defines an associated cuff 68 of a pair of cuffs 68. Each cuff 68 is configured for abutting an associated one of a pair of wrists 24 of the cadaver 16 when the cadaver 16 wears the coverall 12.

Each leg section 38 is coupled to and extends from the bottom end 44 of the torso section 30 adjacent an associated lateral side 46 of the pair of lateral sides 46 of the torso section 30. The pair of leg sections 38 is coupled to each other proximate the bottom end 44 of the torso section 30, and each leg section 38 is configured for covering each of a pair of legs 26 of the cadaver 16 when the cadaver 16 wears the coverall 12. Each foot section 40 is coupled to and extends forwardly from an associated leg section 38 of the pair of leg sections 38. Each foot section 40 is configured for covering each of a pair of feet 28 of the cadaver 16 when the cadaver 16 wears the coverall 12.

A neck adhesive 70 is positioned on the inner surface 52 of the torso section 30 adjacent the neck edge 56 and is configured for adhering to the neck 20 of the cadaver 16 when the cadaver 16 wears the coverall 12, thereby sealing the interior space 14 from an air passing through the neck opening 32. Each of a pair of wrist adhesives 72 is positioned on the inner surface 52 of an associated sleeve section 34 of the pair of sleeve sections 34 adjacent to an associated cuff 68 of the pair of cuffs 68. Each wrist adhesive 72 is configured for adhering to an associated wrist 24 of the pair of wrists 24 of the cadaver 16 when the cadaver 16 wears the coverall 12, thereby sealing the interior space 14 from the air passing through an associated wrist opening 36 of the pair of wrist openings 36.

A zipper 74 has a pair of tracks 76 extending along the inner edge 60 of each front portion 58 of the front side 48 of the torso section 30. The zipper 74 has a slider 78 slidably coupled to each track 76 which couples the inner edges 60 of the pair of front portions 58 when moved to the neck edge 56 and uncouples the inner edges 60 of the pair of front portions 58 when moved to the distal end 62 of the inner edge 60 of each front portion 58. Each of a pair of sealing flaps 80 is coupled to and extends from an associated front portion 58 of the pair of front portions 58 of the front side 48 of the torso section 30 adjacent to the inner edge 60 of the associated front portion 58 and extends into the interior space 14. Each sealing flap 80 is constructed of a flexible, air-impermeable material and is positionable between the inner edges 60 of the pair of front portions 58 and the interior space 14. Each sealing flap 80 is configured for sealing the interior space 14 from the air passing between the inner edges 60 of the pair of front portions 58 when positioned between the inner edges 60 of the pair of front portions 58 and the interior space 14.

A vacuum port 82 extends through the front portion 58 of the torso section 30 proximate the distal end 62 of the inner edge 60 of each front portion 58. The vacuum port 82 is configured for coupling to a vacuum pump for removal of the air from the interior space 14 when the cadaver 16 is wearing the coverall 12 such that a resultant pressure differential urges the coverall 12 into abutment with the cadaver 16. A check valve 84 is positioned within the vacuum port 82 which is configured for permitting the air moving from the interior space 14 through the vacuum port 82 and is also configured for blocking the air moving through the vacuum port 82 to the interior space 14. A port cap 86 is removably couplable to the vacuum port 82 adjacent to the outer surface 54 of the torso section 30 and covers the vacuum port 82 when coupled to the vacuum port 82.

Each of a pair of identification bands 88 is positioned about an associated leg section 38 of the pair of leg sections 38 adjacent to an associated foot 28 portion of the pair of foot 28 portions. Each identification band 88 is configured for receiving an indicium 90 indicating an identifying information concerning the cadaver 16. The indicum could include, for example, a name, a mortuary caring for the cadaver 16, or a date of death.

In use, the slider 78 of the zipper 74 is moved to the distal end 62 of the inner edge 60 of each front portion 58 to uncouple the inner edges 60 of the pair of front portions 58 and enlarge the neck opening 32. The cadaver 16 is positioned in the interior space 14 with the feet 28 of the cadaver 16 being covered by the foot 28 portions of the coverall 12, the legs 26 of the cadaver 16 being covered by the leg 26 portions of the coverall 12, and the arms 22 of the cadaver 16 being covered by the sleeve portions of the coverall 12. The wrist adhesives 72 are positioned in abutment with the wrists 24 of the cadaver 16 so that they adhere to the wrists 24, sealing the interior space 14 from the air passing through the pair of wrist openings 36. Then the slider 78 is moved to the neck end 42 of the torso portion to couple the inner edges 60 while one of the sealing flaps 80 is positioned between the inner edges 60 and the interior space 14. The neck adhesive 70 is positioned in abutment with the neck 20 of the cadaver 16 such that it adheres to the neck 20. The sealing flap 80 seals the air from passing into the interior space 14 between the inner edges 60 and the neck adhesive 70 seals the air from passing into the interior space 14 through the neck opening 32.

The vacuum pump is coupled to the vacuum port 82 and is activated, removing the air from the interior space 14 and urging the coverall 12 to cling to the cadaver 16, thereby containing the cadaver 16 and reducing a bulky appearance of clothing placed on the cadaver 16 over the coverall 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vacuum-sealed cadaver garment device comprising:

a coverall, said coverall defining an interior space, said coverall being constructed of a flexible, air-impermeable material, said coverall being configured for being worn by a cadaver, said coverall comprising:

a torso section having a neck opening, said neck opening extending through said torso section to said interior space and defining a neck edge, said neck edge being configured for abutting a neck of the cadaver when the cadaver wears said coverall; and a pair of sleeve sections defining a pair of wrist openings, each said wrist opening extending through said respective sleeve section to said interior space and defining an associated cuff of a pair of cuffs, each said cuff being configured for abutting an associated one of a pair of wrists of the cadaver when the cadaver wears said coverall;

a neck adhesive, said neck adhesive being positioned adjacent said neck edge, said neck adhesive being configured for adhering to the neck of the cadaver when the cadaver wears said coverall, thereby sealing said interior space from an air passing through said neck opening;

a pair of wrist adhesives, each said wrist adhesive being positioned adjacent to an associated cuff of said pair of cuffs, each said wrist adhesive being configured for adhering to an associated wrist of the pair of wrists of the cadaver when the cadaver wears said coverall, thereby sealing said interior space from the air passing through an associated wrist opening of said pair of wrist openings;

a vacuum port, said vacuum port extending through said torso section to said interior space, said vacuum port being configured for coupling to a vacuum pump for removal of the air from said interior space when the cadaver is wearing said coverall such that a resultant pressure differential urges said coverall into abutment with the cadaver; and a check valve, said check valve being positioned within said vacuum port, said check valve being configured for permitting the air moving from said interior space through said vacuum port, said check valve being configured for blocking the air moving through said vacuum port to said interior space.

2. The device of claim 1, further comprising said coverall further comprising:

said torso section having a neck end and a bottom end, said torso section having a pair of lateral sides extending between said neck end and said bottom end, said torso section having a front side and a back side, each of said front side and said back side extending between said neck end and said bottom end and between said pair of lateral sides, said torso section having an inner surface facing said interior space and an outer surface facing away from said interior space, said torso section being configured for covering a torso of the cadaver when the cadaver wears said coverall, said neck opening extending through said neck end of said torso section to said interior space;

each said sleeve section being coupled to and extending from an associated lateral side of said torso section adjacent to said neck end, each said sleeve section having a distal end relative to said torso section, each said sleeve section having an inner surface facing said interior space, each said sleeve section being configured for covering each of a pair of arms of the cadaver when the cadaver wears said coverall, each said wrist opening being positioned on said distal end of an associated sleeve section of said pair of sleeve sections;

a pair of leg sections, each said leg section being coupled to and extending from said bottom end of said torso section adjacent an associated lateral side of said pair of lateral sides of said torso section, said pair of leg sections being coupled to each other proximate said bottom end of said torso section, each said leg section being configured for covering each of a pair of legs of the cadaver when the cadaver wears said coverall; and a pair of foot sections, each said foot section being coupled to and extending forwardly from an associated leg section of said pair of leg sections, each said foot section being configured for covering each of a pair of feet of the cadaver when the cadaver wears said coverall.

3. The device of claim 2, further comprising said front side of said torso section including a pair of front portions, each front portion having an inner edge extending from said neck edge toward said bottom end of said torso section to a distal end of said inner edge relative to said neck edge, said inner edges of said pair of front portions being removably couplable to each other in abutment, said neck opening enlarging when said inner edges of said pair of front portions uncouple from each other, said neck opening being configured for receiving the cadaver therethrough for wearing said coverall when said inner edges of said pair of front portions are uncoupled from each other.

4. The device of claim 3, further comprising a sealing flap, said sealing flap being coupled to and extending from one front portion of said pair of front portions of said front side of said torso section adjacent to said inner edge of said one front portion, said sealing flap extending into said interior space, said sealing flap being constructed of a flexible, air-impermeable material, said sealing flap being positionable between said inner edges of said pair of front portions and said interior space, said sealing flap being configured for sealing the interior space from the air passing between said inner edges of said pair of front portions when positioned between said inner edges of said pair of front portions and said interior space.

5. The device of claim 4, further comprising said sealing flap being one of a pair of sealing flaps, each said sealing flap being coupled to and extending from an associated front portion of said pair of front portions of said front side of said torso section adjacent to said inner edge of said associated front portion, each said sealing flap extending into said interior space, each said sealing flap being constructed of a flexible, air-impermeable material, each said sealing flap being positionable between said inner edges of said pair of front portions and said interior space, each said sealing flap being configured for sealing the interior space from the air passing between said inner edges of said pair of front portions when positioned between said inner edges of said pair of front portions and said interior space.

6. The device of claim 3, further comprising a zipper, said zipper having a pair of tracks extending along said inner edge of each said front portion of said front side of said torso section, said zipper having a slider slidably coupled to each said track, said slider coupling said inner edges of said pair of front portions when moved to said neck edge, said slider uncoupling said inner edges of said pair of front portions when moved to said distal end of said inner edge of each said front portion.

7. The device of claim 3, further comprising said vacuum port extending through said front portion of said torso section proximate said distal end of said inner edge of each said front portion.

8. The device of claim 2, further comprising an identification band, said identification band being positioned about one of said pair of leg sections adjacent to an associated foot portion of said pair of foot portions, said identification band being configured for receiving an indicium indicating an identifying information concerning the cadaver.

9. The device of claim 1, further comprising a port cap, said port cap being removably couplable to said vacuum port, said port cap covering said vacuum port when coupled to said vacuum port.

10. The device of claim 1, further comprising at least one identification band, each said identification band being positioned on said coverall, and each said identification band being configured for receiving an indicium indicating an identifying information concerning the cadaver.

11. The device of claim 1, further comprising said coverall being constructed of a polymer.

12. The device of claim 11, further comprising said coverall being constructed of polyolefin.

13. The device of claim 11, further comprising said coverall being constructed of vinyl.

14. A vacuum-sealed cadaver garment device comprising:

a coverall, said coverall defining an interior space, said coverall being constructed of a flexible, air-impermeable, and transparent material, said coverall being configured for being worn by a cadaver, said coverall comprising:

a torso section, said torso section having a neck end and a bottom end, said torso section having a pair of lateral sides extending between said neck end and said bottom end, said torso section having a front side and a back side, each of said front side and said back side extending between said neck end and said bottom end and between said pair of lateral sides, said torso section having an inner surface facing said interior space and an outer surface facing away from said interior space, said torso section being configured for covering a torso of the cadaver when the cadaver wears said coverall;

a neck opening, said neck opening extending through said neck end of said torso section to said interior space, said neck opening being centered between said pair of lateral sides of said torso section, said neck opening defining a neck edge, said neck edge being configured for abutting a neck of the cadaver when the cadaver wears said coverall, said front side of said torso section including a pair of front portions, each front portion having an inner edge extending from said neck edge toward said bottom end of said torso section to a distal end of said inner edge relative to said neck edge, said inner edges of said pair of front portions being removably couplable to each other in abutment, said neck opening enlarging when said inner edges of said pair of front portions uncouple from each other, said neck opening being configured for receiving the cadaver therethrough for wearing said coverall when said inner edges of said pair of front portions are uncoupled from each other;

a pair of sleeve sections, each said sleeve section being coupled to and extending from an associated lateral side of said torso section adjacent to said neck end, each said sleeve section having a distal end relative to said torso section, each said sleeve section having an inner surface facing said interior space, each said sleeve section being configured for covering each of a pair of arms of the cadaver when the cadaver wears said coverall;

a pair of wrist openings, each said wrist opening being positioned on said distal end of an associated sleeve section of said pair of sleeve sections, each said wrist opening defining an associated cuff of a pair of cuffs, each said cuff being configured for abutting an associated one of a pair of wrists of the cadaver when the cadaver wears said coverall;

a pair of leg sections, each said leg section being coupled to and extending from said bottom end of said torso section adjacent an associated lateral side of said pair of lateral sides of said torso section, said pair of leg sections being coupled to each other proximate said bottom end of said torso section, each said leg section being configured for covering each of a pair of legs of the cadaver when the cadaver wears said coverall; and a pair of foot sections, each said foot section being coupled to and extending forwardly from an associated leg section of said pair of leg sections, each said foot section being configured for covering each of a pair of feet of the cadaver when the cadaver wears said coverall;

a neck adhesive, said neck adhesive being positioned on said inner surface of said torso section adjacent said neck edge, said neck adhesive being configured for adhering to the neck of the cadaver when the cadaver wears said coverall, thereby sealing said interior space from an air passing through said neck opening;

a pair of wrist adhesives, each said wrist adhesive being positioned on said inner surface of an associated sleeve section of said pair of sleeve sections adjacent to an associated cuff of said pair of cuffs, each said wrist adhesive being configured for adhering to an associated wrist of the pair of wrists of the cadaver when the cadaver wears said coverall, thereby sealing said interior space from the air passing through an associated wrist opening of said pair of wrist openings;

a zipper, said zipper having a pair of tracks extending along said inner edge of each said front portion of said front side of said torso section, said zipper having a slider slidably coupled to each said track, said slider coupling said inner edges of said pair of front portions when moved to said neck edge, said slider uncoupling said inner edges of said pair of front portions when moved to said distal end of said inner edge of each said front portion;

a pair of sealing flaps, each said sealing flap being coupled to and extending from an associated front portion of said pair of front portions of said front side of said torso section adjacent to said inner edge of said associated front portion, each said sealing flap extending into said interior space, each said sealing flap being constructed of a flexible, air-impermeable material, each said sealing flap being positionable between said inner edges of said pair of front portions and said interior space, each said sealing flap being configured for sealing the interior space from the air passing between said inner edges of said pair of front portions when positioned between said inner edges of said pair of front portions and said interior space;

a vacuum port, said vacuum port extending through said front portion of said torso section proximate said distal end of said inner edge of each said front portion, said vacuum port being configured for coupling to a vacuum pump for removal of the air from said interior space when the cadaver is wearing said coverall such that a resultant pressure differential urges said coverall into abutment with the cadaver;

a check valve, said check valve being positioned within said vacuum port, said check valve being configured for permitting the air moving from said interior space through said vacuum port, said check valve being configured for blocking the air moving through said vacuum port to said interior space;

a port cap, said port cap being removably couplable to said vacuum port adjacent to said outer surface of said torso section, said port cap covering said vacuum port when coupled to said vacuum port; and a pair of identification bands, each said identification band being positioned about an associated leg section of said pair of leg sections adjacent to an associated foot portion of said pair of foot portions, each said identification band being configured for receiving an indicium indicating an identifying information concerning the cadaver.

* * * * *